INVENTORS.
ROGER Q. FIELDS.
ROBERT DESBRANDES.
BY Robert Hockfield
THEIR ATTORNEY.

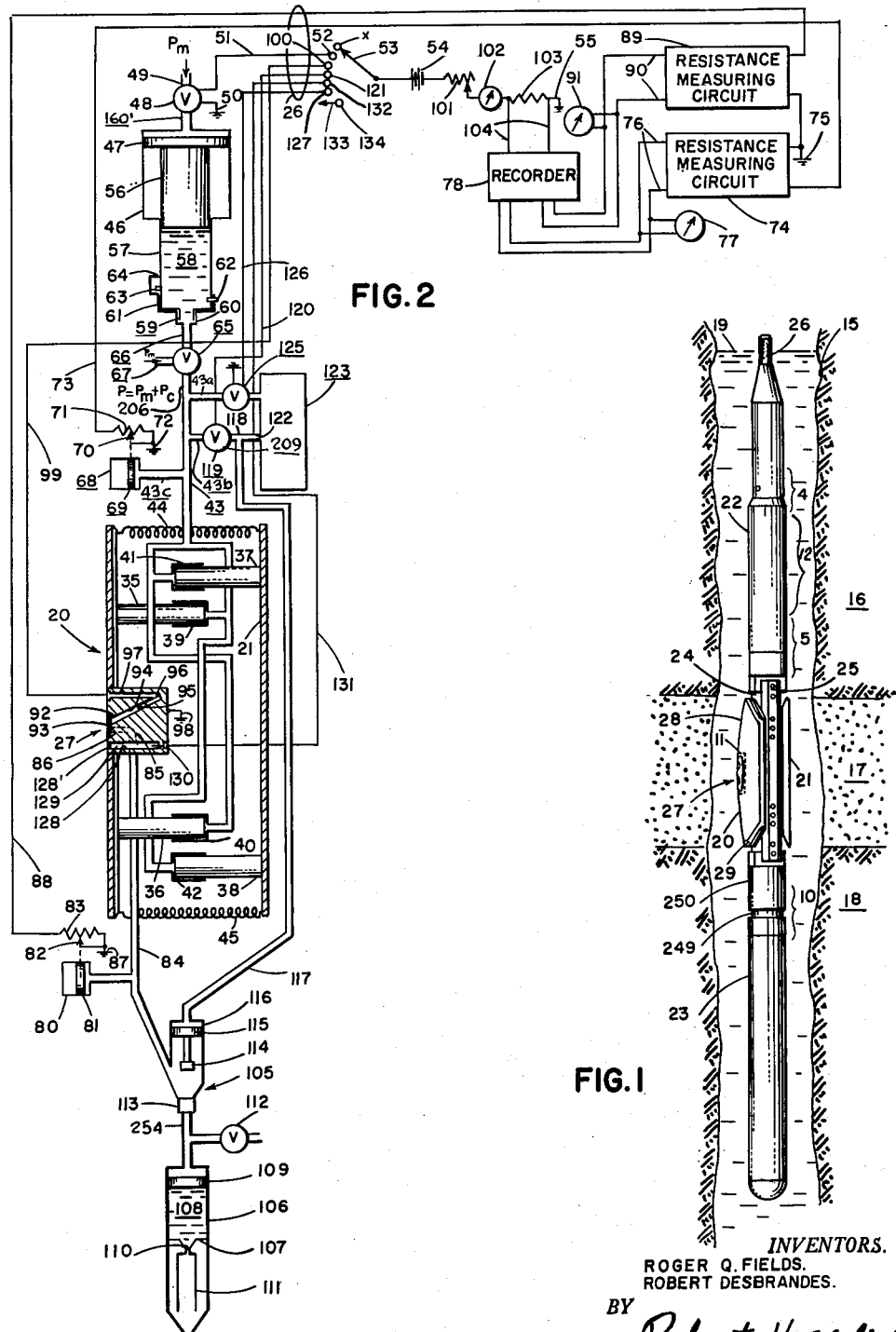

*INVENTORS.*
ROGER Q. FIELDS.
ROBERT DESBRANDES.
BY
Robert Hockfield

THEIR ATTORNEY.

Dec. 5, 1961  R. DESBRANDES ET AL  3,011,554
APPARATUS FOR INVESTIGATING EARTH FORMATIONS
Filed Jan. 23, 1956  5 Sheets-Sheet 4

INVENTORS.
ROGER Q. FIELDS.
ROBERT DESBRANDES.
BY Robert Hockfield
THEIR ATTORNEY.

Dec. 5, 1961    R. DESBRANDES ET AL    3,011,554
APPARATUS FOR INVESTIGATING EARTH FORMATIONS
Filed Jan. 23, 1956    5 Sheets-Sheet 5

To cylinders 39-42

*INVENTORS.*
ROGER Q. FIELDS,
ROBERT DESBRANDES
BY

*ATTORNEY*

United States Patent Office 3,011,554
Patented Dec. 5, 1961

3,011,554
APPARATUS FOR INVESTIGATING EARTH
FORMATIONS
Robert Desbrandes and Roger Q. Fields, Houston, Tex., assignors, by mesne assignments to Schlumberger Well Surveying Corporation, Houston, Tex., a corporation of Texas
Filed Jan. 23, 1956, Ser. No. 560,710
21 Claims. (Cl. 166—100)

The present invention relates to apparatus for investigating earth formations and, more particularly, to new and improved apparatus of the type disclosed in Patent No. 2,674,313 issued April 13, 1954 to L. S. Chambers for "Sidewall Formation Fluid Sampler," for obtaining samples of the fluids contained in earth formations traversed by a borehole.

Briefly stated, the earth formation fluid sampler described in the Chambers' patent includes a support adapted to be positioned in a borehole at the level of a formation of interest. The support carries pack-off and back-up shoes along with a hydraulic system for driving the shoes into engagement with the sidewall of the borehole. Thus, that portion of the formation under the pack-off shoe is sealed from the drilling liquid that usually fills the borehole, and fluid from the formation may flow via an entry port in the pack-off shoe to a sample-retaining chamber within the support. After a desired amount of fluid is obtained, the sample-retaining chamber is closed, the shoes are retracted and the apparatus is withdrawn from the borehole so that the sample may be measured and analyzed.

It is a general object of the present invention to provide new and improved earth formation fluid sampling apparatus of the foregoing type having increased reliability and efficiency in operation.

A specific object of the present invention is to provide a new and improved fluid-sampling apparatus affording information concerning the functioning of various components throughout an entire cycle of operation.

Another object of the present invention is to provide a new and improved earth formation fluid sampling apparatus arranged to produce indications which are diagnostic of the proper functioning of the apparatus.

A particular object of the present invention is to provide a new and improved hydraulic system for actuating various components in an earth formation fluid sampler.

Still another object of the present invention is to provide a new and improved valve arrangement for the sample-receiving chamber of earth formation fluid sampling apparatus.

A further object of the present invnetion is to provide a new and improved wall-engaging member or pack-off shoe for an earth formation fluid sampler for maintaining a good seal with the sidewall of a borehole despite the operation of explosively-operated formation-penetrating means.

Earth formation fluid sampling apparatus according to the present invention comprises a support adapted to be passed through a borehole to the level of a selected earth formation. A wall-engaging device is mounted to the support for movement between a retracted position and an extended or active position in engagement with the sidewall of the borehole. The wall-engaging device has a sample-admitting portion, and a sample-receiving conduit is fluidly coupled to the selected earth formation via the sample-admitting portion.

In one embodiment, the apparatus additionally comprises a hydraulic system that includes a pressure-responsive actuator mechanically coupled to the support and to the wall-engaging device for extending and retracting the wall-engaging member. A hydraulic driver is fluidly coupled to the pressure-responsive actuator for selectively increasing and decreasing fluid pressure thereto. A pair of pressure transducers are exposed to the hydraulic pressures in the hydraulic system and in the sample-receiving conduit, respectively, for deriving control effects representing each of the aforesaid hydraulic pressures. Indicating means are provided for deriving simultaneous indications of these control effects, whereby the operator may be apprised of the proper operation of the apparatus and of the completions of the various phases of the operation.

In accordance with another embodiment of the present invention, the hydraulic driver obtains its power from means exposed to the liquid in the borehole for deriving a hydraulic pressure in response to the pressure of this liquid. In order that the pressure applied to the pressure responsive actuator will not exceed predetermined limits, the hydraulic driver is coupled to the hydraulic actuator through a path including a fluid pressure limiter.

In another embodiment of the invention there is disposed in the fluid communication path between the selected earth formation and to the sample-receiving chamber valve means that includes a hydraulically-operated valve element movable from a releasably locked, first position to a locked, second position interrupting the aforesaid fluid communication path. The apparatus further includes means for applying hydraulic pressure to the valve element to displace it between its first and second positions, whereby proper operation is assured.

According to another embodiment of the invention a fluid conduit is hydraulically connected to a point in the hydraulic system and has one branch extending to the hydraulically-operated valve in the fluid sampling line and another branch including a fluid-flow-controlling orifice extending to a low pressure chamber. The apparatus also comprises valve means normally closing the fluid conduit, but selectively operable to open the fluid conduit to fluid flow, thus permitting the fluid sampling line to be closed by the hydraulic pressure in the wall-engaging hydraulic system.

The invention also features a wall-engaging member which comprises a body having a wall-engaging surface, a bore extending transversely relative to the wall-engaging surface and a recess in the wall-engaging surface in the vicinity of one extremity of the bore. Closing means normally block the bore to fluid flow, and explosive means is provided for operating on the closing means selectively to open the bore to fluid flow and to penetrate a surface engaged by the wall-engaging member.

The novel features of the present invention are set forth with particularity in the appended claims. The present invention, both as to its organization and manner of operation, together with further objects and advantages thereof, may be better understood by reference to the following description taken in connection with the accompanying drawings in which:

FIG. 1 is a view of an earth formation fluid sampler embodying the present invention shown in operative position in a borehole prior to the actuation of its wall-engaging shoes;

FIG. 2 is a simplified, schematic representation of the apparatus illustrated in FIG. 1 and includes an electrical circuit extending to equipment at the surface of the earth;

Figure 5A:
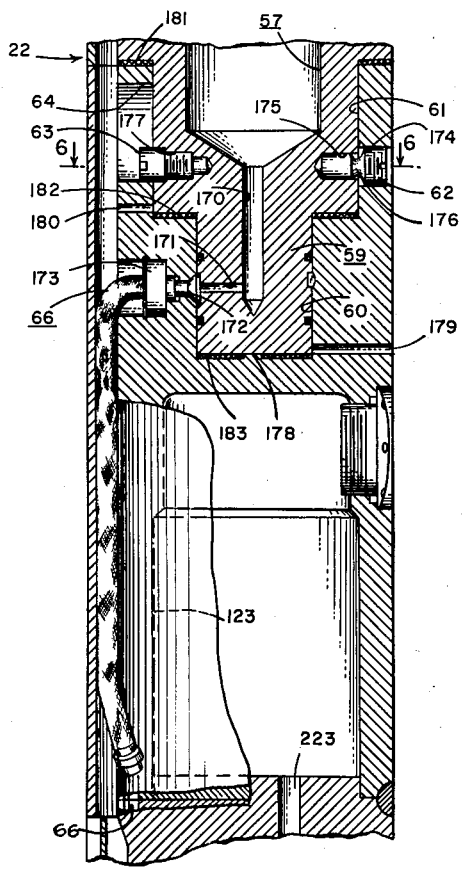
FIGS. 5a and 5b illustrate, in longitudinal cross-section, the upper and lower portions, respectively of section 5 of the apparatus of FIG. 1, drawn to an enlarged scale.
Figure 5B:
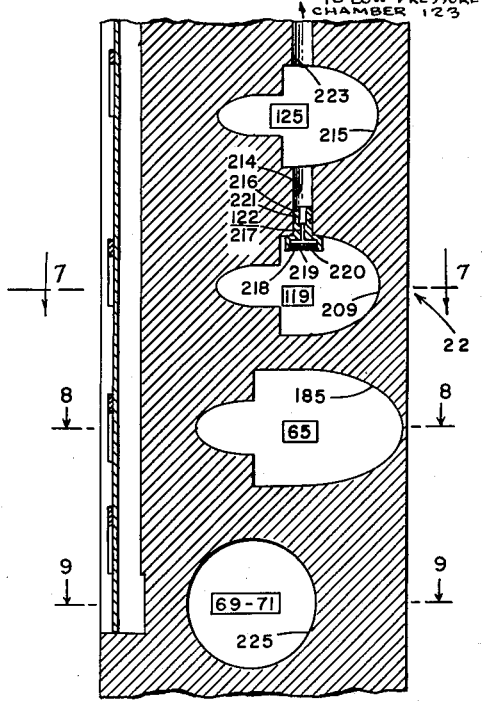
Figure 6:
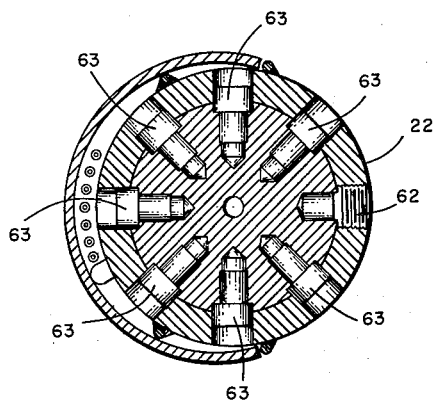
Figure 7:
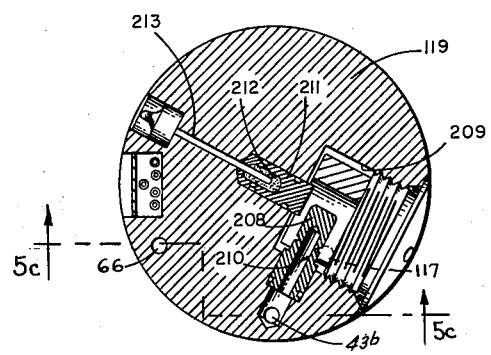
Figure 8A:
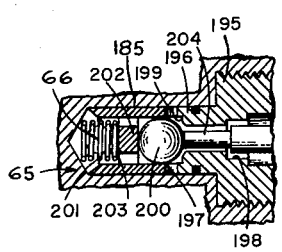
Figure 8:
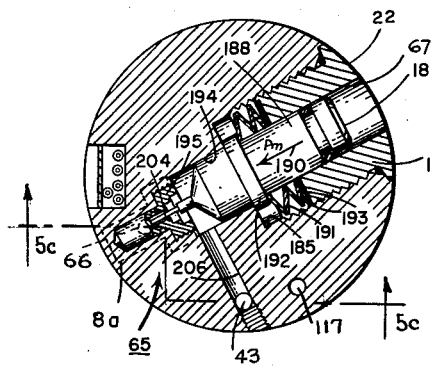
Figure 9:
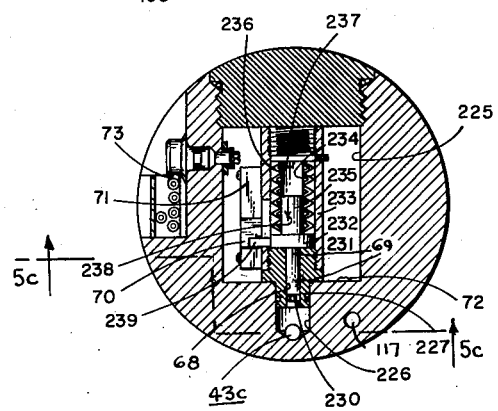
Figure 5C:
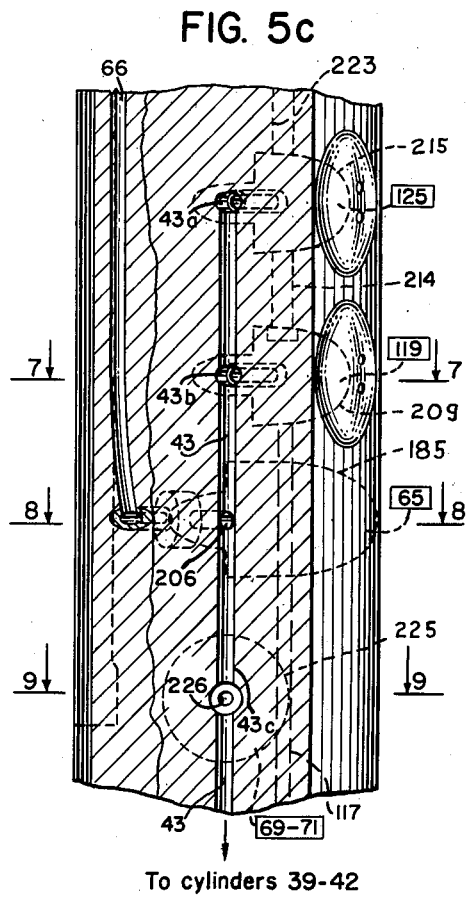

FIG. 5c illustrates a section view, different from that of FIGS. 5a and 5b, of the lower portion of section 5 of the apparatus of FIG. 1, drawn to an enlarged scale and taken along lines 5c of FIGS. 7, 8 and 9;

FIG. 6 is a cross-sectional view taken along lines 6—6 of FIG. 5a;

FIGS. 7, 8 and 9 are cross-sectional views taken along lines 7—7, 8—8 and 9—9, respectively, of the apparatus represented in FIG. 5b;

FIG. 8a is an enlarged representation of a portion of FIG. 8 within dash-line enclosure 8a.

Figure 10:
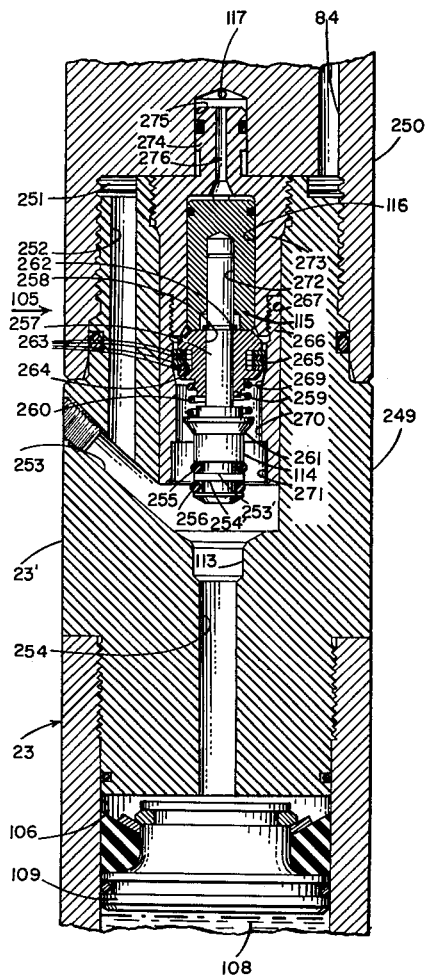
Figure 11:
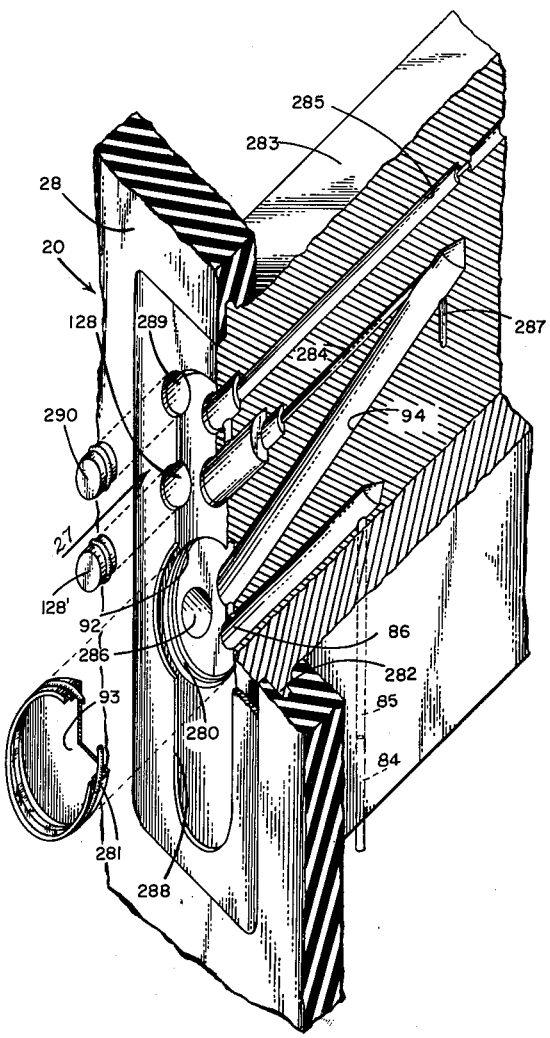
Figure 12:
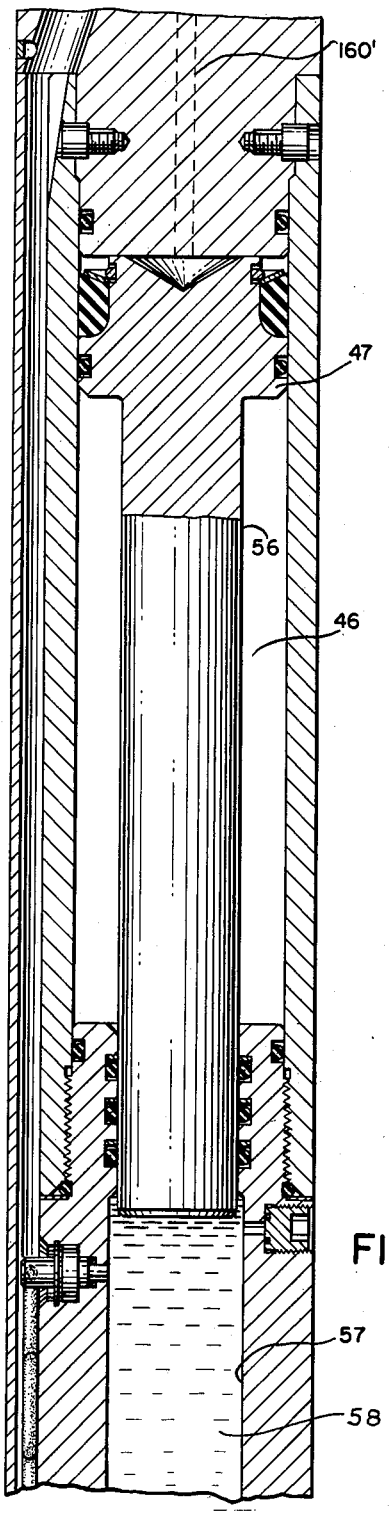

FIG. 10 is a view in longitudinal cross-section and drawn to an enlarged scale of the portion of the apparatus shown in FIG. 1 designated by the numeral 10;

FIG. 11 is an enlarged, perspective view of the portion of the apparatus illustrated in FIG. 1 designated by the rectangle 11, portions thereof being cut away and shown in section in order to reveal various interior details; and FIG. 12 is a view in longitudinal cross-section of the portion of the apparatus in FIG. 1 designated by the numeral 12, drawn to an enlarged scale.

In FIG. 1 of the drawings, an earth formation fluid sampler embodying the present invention is shown disposed in a borehole 15 traversing earth formations 16, 17 and 18 and containing a drilling liquid 19 such as a water base or oil base mud. It is assumed that formation 17 in the one of interest from which a fluid sample is to be obtained and the apparatus is positioned in the borehole 15 so that a central section including a normally-retracted pad or pack-off shoe 20 and an oppositely positioned, normally-retracted back-up shoe 21 are adjacent formation 17.

The fluid sampler further comprises upper and lower pressure-resistant housing sections 22 and 23 connected together in longitudinally spaced relation by a pair of side rails 24, 25. The side rails 24 and 25 are transversely spaced from one another to provide an opening for receiving hydraulic pressure responsive actuators which, as will be described hereinafter, are employed to drive the shoes 20 and 21 into engagement with respective sidewall portions of borehole 15. The apparatus thus far described is suspended in the borehole 15 by an electrical cable 26 which, in connection with a winch (not shown) located at the surface of the earth, is employed to lower and raise the apparatus in the borehole in a customary manner.

Generally stated, upper housing section 22 contains a hydraulic driver of the type described in the aforementioned Chambers patent which employs the pressure of borehole liquid 19 to produce hydraulic pressure for driving the actuators that move the shoes 20 and 21. Of course, other arrangements for developing hydraulic pressure may be employed, such as a motor-driven pump. Housing section 23 contains a sample-receiving chamber, also of the type described in the Chambers patent, fluidly connected to a central portion 27 of the pack-off shoe 20. Central portion 27 may be in the form of an insert to be described hereinafter in detail in connection with FIG. 11, in a sealing face 28 which may be constructed of a sheet of flexible material, such as rubber. The pack-off shoe may embody the principles set forth in copending application Serial No. 418,650, filed March 25, 1954, by H. B. Boller entitled "Pack-Off Shoe," now Patent No. 2,821,256, issued January 28, 1958. Thus, the central portion of pack-off shoe 20 containing the insert 27 is spaced in a direction away from the longitudinal axis of the borehole apparatus with respect to a support ring 29 for the sealing face 28. When the pack-off shoe 20 and the back-up shoe 21 are driven into engagement with prospective sidewall portions of the borehole 15, tangential forces are developed in the sealing face 28 so that it conforms very closely to a relatively large section of the sidewall and provides a very effective fluid seal.

In the simplified, schematic representation of FIG. 2, those of the elements which appear in FIG. 1 are identified by the same reference numerals. To displace the shoes 20, 21 from their normally-retracted positions illustrated in FIG. 2, each is mechanically connected to a pair of pistons 35, 36 and 37, 38, respectively. The pistons 35 and 36 are received by respective hydraulic cylinders 39 and 40 while the pistons 37 and 38 are received by cylinders 41 and 42. All of the cylinders are connected to a hydraulic line 43 filled with a relatively incompressible liquid so that when pressure is applied to the line 43 the several pistons are displaced relative to their respective cylinders and the shoes 20 and 21 are moved into engagement with the sidewall of a borehole in the manner described in the aforementioned patent to Chambers. When the hydraulic pressure is subsequently reduced the shoes 20 and 21 are drawn toward one another by means of upper and lower retracting springs 44 and 45 extending between adjacent extremities of the shoes as well as through the effect of the hydrostatic pressure of the drilling mud in the borehole acting on the shoes.

As further disclosed in the Chambers' patent, in order to develop a hydraulic pressure in line 43 a hydraulic driver is provided including a hollow cylinder 46 preferably containing air at atmospheric pressure. A piston 47 is slidable within cylinder 46 and is normally positioned at the upper end of the cylinder which is coupled via conduit 160' and an electrically-operated valve 48 to an inlet pipe 49 arranged to be exposed to the drilling mud 19 in borehole 15 (FIG. 1). Valve 48 may be like the one to be described later with reference to FIG. 4. An electrical circuit for the valve includes a ground connection 50 and an electrical conductor 51 extending through cable 26 to a fixed contact 52 of an operating switch positioned at the surface of the earth. This switch has a movable arm 53 having in circuit therewith a source of electrical potential, such as a battery 54 connected to a ground return 55 through a circuit to be described more fully hereinafter.

A piston rod 56 is mechanically connected at its upper end to the underside of piston 47 and extends through cylinder 46. The free end (that end not connected to the piston 47) of piston rod 56 is slidably movable in another cylinder 57 filled with a substantially incompressible liquid, such as an appropriate hydraulic oil 58 as illustrated in FIG. 12. The diameter of cylinder 46 is larger than the diameter of cylinder 57 so that when the upper side of piston 47 is exposed to the pressure of the drilling liquid in borehole 15, a higher pressure is developed in liquid 58 within cylinder 57. For example, the ratio of their areas in lateral cross-section may be on the order of 2.75 which provides a pressure multiple of 2.75 within the liquid 58. Of course, this ratio may be selected in a known manner to take into account the amount of liquid in the hydraulic system and the range of pressures from the drilling liquid to be encountered. Moreover, the length and diameter of the borehole instrument should be taken into account.

The lower end of cylinder 57 has a short, tubular extension 59 normally received by a small cylindrical bore 60 of a receptacle having an upper extension 61 providing a seat for the lower end of the cylinder 57. Appropriate means may be provided to effect a fluidly sealed connection between the members 59 and 60.

The cylinder 57 and the receptacle 61 are maintained in a releasably-fixed longitudinal relation by means of a shear pin 62 whose function will be described hereinafter. In order to limit relative longitudinal displacement after shear pin 62 is broken, a lateral pin 63 extending from cylinder 57 is arranged to engage a mechanical stop 64 that is connected to receptacle 61. This arrangement will be described more fully in connection with FIGS. 5a and 6.

As pointed out hereinbefore, the pressure developed in hydraulic fluid 58 is greater than the pressure of drilling liquid 19. To maintain a given pressure condition in the hydraulic system, in accordance with the present invention there is provided a regulating valve 65 connected by a conduit 66 to tubular member 60 and to an extension 206 (FIGS. 2, 5c and 8) of hydraulic line 43. Valve 65 is also exposed to the pressure of drilling liquid 19 which is applied to the open end of a conduit or bore 67. This valve may be of any conventional construction by means of which the pressure in hydraulic line 43, P is always maintained at a value equal to the pressure of the drilling liquid, $P_m$, plus a constant pressure, $P_c$. If desired, valve 65 may be of the specific type to be described hereinafter in connection with FIG. 8.

In accordance with another feature of the present invention means is provided for monitoring the pressure in hydraulic line 43. To this end, the apparatus includes a pressure transducer which may be of any conventional type or of the particular variety to be described hereinafter in connection with FIG. 9. In brief, this transducer comprises a cylinder 68 having one extremity fluidly connected to a branch 43c of hydraulic line 43. A piston 69 slidably positioned within cylinder 68 is normally disposed at the just-mentioned extremity of the cylinder and is mechanically connected to a movable arm 70 of a resistance element 71. One end of the resistance element 71 and the movable arm 70 are grounded at point 72, and the remaining end of the resistance element is connected by an electrical conductor 73 that extends via cable 26 to a resistance-measuring circuit 74 at the surface of the earth. Circuit 74 is grounded at point 75 and it may be constructed in any known manner for providing a voltage at leads 76 that is representative of the resistance of variable resistor 70, 71. For example, a conventional resistance bridge may be employed. Leads 76 may be coupled to a voltmeter 77 and to a conventional recorder 78 in which the recording medium is displaced as a function of time to provide a record of the type to be described hereinafter.

In accordance with the present invention, sample pressure is also monitored. Thus, the apparatus includes another pressure transducer similar to the one just described comprised of a cylinder 80 having a piston 81 that is mechanically connected to movable arm 82 of a resistance element 83. Details of this pressure transducer and the one just described will be given in reference to FIGURE 9. One end of the cylinder 80 is connected to a side branch of a sample-conveying conduit 84 having its upper end connected to a conduit 85 extending through insert 27 to a sample-admitting aperture 86. Arm 82 and resistance element 83 are grounded at 87 and the remaining end of the resistance element is connected by an electrical conductor 88 extending through cable 26 to another resistance-measuring circuit 89. Output leads 90 of circuit 89 are connected to a voltmeter 91 and to recorder 78.

Insert 27 is constructed of an electrically conductive material and has a shallow recess 92 in its front face to provide a seat for a closure 93 which normally blocks opening 86 to fluid flow. To unblock opening 86 and to penetrate the formation under investigation, a gun bore 94 extends rearwardly from recess 92 and receives a bullet 95. The gun bore also receives a propellant 96 and an electrical igniter 97 extends through the insert 27 into operative relation with the propellant. One terminal (not shown) of the igniter 97 is connected to the insert 27 and the insert is grounded at point 98. The remaining terminal of the igniter is connected by an electrical conductor 99 that extends through cable 26 to another fixed contact 100 positioned for engagement by movable arm 53. To complete the firing circuit for the igniter, in series relation between battery 54 and ground 55 are a rheostat 101, an indicating ammeter 102 and a monitor resistor 103. Leads 104 extend from the terminals of resistor 103 to the recorder 78.

Referring once again to sample-conveying conduit 84, its lower extremity is connected via a hydraulically-operated valve 105 and conduit 254 to the upper end of the sample-receiving chamber 106. Chamber 106 is divided by a partition 107 to define an upper section in the form of a hydraulic cylinder which receives a relatively incompressible liquid such as water 108. At the upper surface of this liquid, there is disposed a slidably movable piston 109. The partition 107 is provided with a fluid-flow controlling orifice 110 connected to the upper end of a tube 111 that extends through the lower section of chamber 106 containing air at atmospheric pressure. At the junction between valve 105 and chamber 106 there is provided a branch having a valve 112 so that subsequent to a complete cycle of operation, the resulting formation fluid sample may be recovered at the surface of the earth.

The form of sample-receiving chamber just described is of the general type disclosed in the earlier mentioned Chambers patent.

In accordance with the present invention, valve 105 is hydraulically operated between a first releasably locked position to a more positively locked or fastened second position as will be described in detail in connection with FIG. 10. Briefly, valve 105 includes a seat 113 adapted to receive a movable valve element 114 that is connected to a piston 115 slidably movable within a cylinder 116. The first position for valve element 114 is the one illustrated in FIG. 2 where it is releasably locked. Under the influence of hydraulic pressure applied to a hydraulic line 117 connected to cylinder 116, piston 115 is unlocked and is displaced downwardly carrying element 114 into seat 113 where it is locked.

In order to apply hydraulic pressure to line 117, it is connected by a conduit 118 to an electrically-operated valve 119, in turn, coupled to a side branch 43b of hydraulic line 43. Valve 119 may be of the type to be described in connection with FIG. 7 and is electrically connected to ground and to a lead 120 that extends through cable 26 to a fixed contact 121 engageable by a movable arm 53. Another extension of hydraulic line 118 is connected via a fluid-flow controlling orifice 122 to a chamber 123 containing air at atmospheric pressure. Thus, when valve 119 is operated to provide a fluid connection between lines 43 and 118, pressure is applied to line 117 and at the same time is bled into low pressure chamber 123. However, because of the presence of orifice 122, valve 105 is operated before a substantial amount of pressure is released in the hydraulic system.

As a safety measure, another hydraulic line 43a extends between line 43 and low pressure chamber 123. An electrically-operated valve 125 normally closes line 43a and has a connection to ground and a lead 126 extending through cable 26 to another terminal 127 engageable by a movable contact 53.

Since it is desirable to employ a pack-off shoe affording an excellent seal with the sidewall of the borehole, a release mechanism of the type described in copending application Serial No. 418,644, filed March 25, 1954, now Patent No. 2,851,107, by Clyde C. Chivens and Roger Q. Fields entitled "Release Mechanism for a Pack-Off Shoe" is provided. To this end, insert 27 is provided with a bore 128 extending between its front and rear surfaces. The forward end of the bore 128 is blocked by a closure 128' and it is filled with an explosive material 129, such as gun powder or the like. The rear end of bore 128 receives an electrical igniter 130 connected to insert 27 and to an electrical conductor 131 that traverses cable 26 and terminates at a fixed contact 132 which is engageable by movable arm 53. If an additional safety measure is desired, another similar bore may be provided (not shown) and likewise containing an explosive material and an igniter connected by a lead 133 to another fixed contact 134.

In describing a complete cycle of operation for the apparatus just described, occasional reference will be made to FIG. 3 in which the pressures at transducers 68—71 and 80—83 and the firing current developed at resistor 103 are plotted to a common time scale.

To prepare the apparatus for operation the hydraulic system including chamber 57, line 66, line 43 and the cylinders 39—42 are filled with hydraulic liquid 58. The shoes 20 and 21 are assisted toward their retracted positions; however, at these positions, the pistons 35—38 are not entirely at the rear ends of their respective cylinders. It will be recalled that normally piston 47 is at the upper end of cylinder 46; in valve 105 piston 114 is at the upper end of cylinder 116; in the transducers pistons 69 and 81 are at the right-hand ends of their respective cylinders 68 and 80; and the valves 48, 112, 119 and 125 are closed. Moreover, movable switch arm 53 is in a quiescent position designated "x."

Figure 3:
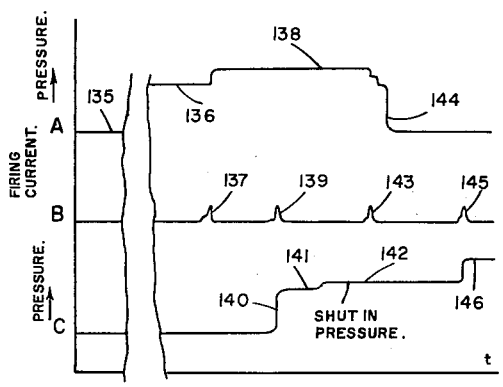
FIG. 3 represents typical indications which may be obtained during a complete cycle of operation of the apparatus illustrated in FIGS. 1 and 2.

At the surface, before the apparatus is lowered into the borehole, recorder 78 is energized and there is derived a reference line denoted by numeral 135 on the graph A in FIG. 3 which represents the pressure in hydraulic line 43. This, of course, is very close to atmospheric pressure. As the apparatus is lowered, the hydrostatic pressure of drilling liquid 19 increases and the corresponding pressure on shoes 20 and 21 force the pistons 35—38 to increase the hydraulic pressure in their respective cylinders, thereby increasing the pressure in hydraulic line 43. At the depth of the selected formation, the pressure may reach a value denoted by curve portion 136 in FIG. 3. Accordingly, a continuous record is obtained, as the apparatus is lowered, of the hydrostatic pressure of the drilling liquid.

To assist in positioning the apparatus at the desired depth, an electrode may be provided so that a record of spontaneous potential can be derived, as mentioned in the Chambers' patent. This record can be compared with previously obtained logs for the same borehole for accurate correlation of depths and positioning of the apparatus.

After the apparatus is brought to a position, such as the one illustrated in FIG. 1, arm 53 is manually carried into engagement with contact 52, rheostat 101 being adjusted so that an adequate current will flow to operate valve 48. Thus, borehole liquid 19 may flow via conduit 49, valve 48 and conduit 160 into the upper end of cylinder 46 and piston 47 is exposed to the relatively high hydrostatic pressure in the borehole. Because its underside is exposed to the relatively low pressure within cylinder 46, the piston 47 is displaced downwardly and rod 56 is forced into cylinder 57.

Since the area of piston 47 is larger than the area of the free end of piston rod 56, it is obvious that for a given amount of displacement of the piston 47, in response to a particular pressure of the liquid applied to the upper end of cylinder 46, a greater pressure will be developed in hydraulic fluid 58. Valve 65 effectively compares the pressures in lines 66 and 67 to provide a pressure in hydraulic line 43 that is equal to the pressure of the borehole fluid plus a fixed additional amount. For example, the additional amount may be of the order of 3,000 to 5,000 pounds per square inch. Thus, if valve 65 is adjusted so that the constant amount is 4,500 pounds per square inch, after a given hydrostatic pressure is reached in the borehole, the pressure in line 43 will always be 4,500 pounds per square inch greater than the pressure of the borehole liquid 19 at the level of the apparatus. The pressure in line 43 is employed to actuate the pistons that drive the shoes 20 and 21 into engagement with respective portions of the sidewall of the borehole, and since shoes 20 and 21 operate against the hydrostatic pressure in the borehole, valve 65 assures that below a given borehole level, the pressure applied to pistons 35, 36, 37 and 38 will always be sufficient to activate shoes 20 and 21, but will not be so great as to damage the equipment.

Valve 48 preferably may be of the explosive type using an electrical igniter, thus a surge of current flows through resistor 103 when the valve is operated and a pulse 137 (FIG. 3) is recorded in the trace B representing firing current and essentially immediately the pressure in hydraulic line 43 increases to a level 138 on the graph A corresponding to the fixed differential over the borehole pressure provided by regulating valve 65.

If desired, at this point in the cycle of operation, cable 26 may be drawn upwardly and an increase in cable tension may be observed thereby indicating that the shoes 20 and 21 have been driven firmly into engagement with the sidewall of borehole. Thereafter, the tension on cable 26 may be released.

In the following portion of an operating cycle, movable arm 53 is displaced into engagement with contact 100 to complete an electrical circuit with igniter 97. When this igniter is fired, a current pulse in resistor 103 produces the voltage pulse 139 on the graph B (FIG. 3) in the recorder indicating that explosive 96 has been detonated. The detonation of explosive 96 causes projectile 95 to be driven out of bore 94 thereby rupturing closure 93. Accordingly, sample-admitting aperture 86 is opened to the formation fluid pressure as exhibited by the sharp increase 140 on the graph C of FIG. 3, representing a sharp increase in the pressure in the sample-conveying line 84. Thus, for the particular illustrative example, the pressure in this line quickly rises to a value 141. During the following interval of time fluid from the formation 17 flows through conduit 85, conduit 84, valve 105 and into the upper end of chamber 106. In this interval the pressure remains essentially at the value denoted by curve portion 141 on the graph C in FIG. 3 representing the flowing pressure.

It will be noted that the time required for taking a fluid sample depends upon, among other factors, the nature of the formation, the formation pressure and the size of orifice 110 which determines the rate at which cushion liquid 108 flows into the lower section of compartment 106 as formation fluid forces piston 109 downwardly. When the sample chamber is filled, fluid flow, of course, ceases and the recorded pressure increases to a value 142 on the graph C (FIG. 3). This represents the shut-in or formation pressure and may occur anywhere from thirty seconds to ten minutes after the sample chamber is first opened to fluid flow. In some instances, the time may be even longer and if time is not available to wait for a rise to shut-in pressure, the next step can be taken. In either case, movable contact 53 is carried into engagement with fixed contact 121 to open valve 119. The operation of valve 119 is denoted by a pulse 143 on the graph B in FIG. 3 and with the opening of this valve, hydraulic pressure is applied over line 117 to the upper end of cylinder 116. As a result, piston 115 is displaced downwardly and valve element 114 is carried into seat 113 to close valve 105.

At the same time, hydraulic pressure is bled via orifice 122 into low pressure chamber 123 and the pressure in hydraulic line 43 drops as indicated by portion 144 of the curve A represented in FIG. 3.

It will be noted that for a situation in which the shut-in pressure has not been reached prior to the closing of valve 105, after the valve is closed, the pressure in line 84 will gradually build up to the formation pressure and this will be evidenced in the recorder 78.

For the next portion of the operating cycle, cable 26 is drawn upwardly from the surface of the earth to provide a preselected amount of tension and movable arm 53 is carried into engagement with fixed contact 132 thereby completing an electrical circuit to igniter 130. Explosive 129 in bore 128 of insert 27 is detonated, as represented by pulse 145 on the curve B in FIG. 3, to blow out closure 128'. Thus, at the same time a fluid path is established between the front and rear surfaces of pack-off shoe 20 to destroy the seal between the shoe and the sidewall of the borehole, and explosive force is created which tends to displace shoe 20 away from the sidewall, facilitating the withdrawal of the shoe 20 by the springs 44 and 45 when the pressure in hydraulic line 43 is sufficiently reduced. If the seal is successfully broken, the cable tension decreases. In addition, since the sample line is exposed to mud pressure almost immediately with the firing of the igniter, the pressure in sample line 84 increases to the value denoted by curve portion 146 in FIG. 3. Thereafter, the apparatus may be drawn to the surface of the earth and the sample recovered by operating the valve 112.

Returning to the discussion of the portion of an operating cycle subsequent to the function of valve 119, if the indications reveal that the pressure in hydraulic line 43 has not been reduced, one of the several safety features of apparatus embodying the present invention may be employed. Accordingly, movable arm 53 may be carried into engagement with fixed contact 127 thereby connecting current source 54 to valve 125. By so opening this valve, a fluid path is established directly between hydraulic line 43 and low pressure chamber 123 via conduit 43a. Usually, assuming a condition wherein valve 119 has not produced the desired result, the operation of valve 125 is accompanied by a reduction in hydraulic pressure.

If, however, the shoes 20 and 21 still remain in engagement with the sidewall of the borehole, cable 26 is drawn upwardly to produce a tension sufficient to break the shear pin 62. In this way, fluid from hydraulic cylinder 57 and line 66 is bled to the borehole and the pressure in the hydraulic system becomes equal to the pressure of borehole liquid 19. Thus, the springs 44 and 45 can operate to retract shoes 20 and 21 after the release mechanism is fired.

If it appears that the release mechanism including the material in bore 128 of insert 27 has failed to function, movable arm 53 may be carried into engagement with fixed contact 134 thereby to operate the aforementioned second release mechanism (not shown) through the lead 133 to an igniter and explosive material in a bore similar to bore 128 in insert 27. Ordinarily, this will bring about the desired result and the shoes 20 and 21 may be retracted by the springs. Although the second release mechanism has been described as used subsequent to the mode of operation wherein shear pin 62 is broken, it is possible to employ this safety feature during a portion of an operating cycle after the operation of either of valves 119 or 125.

While the function of the monitor system has been described in connection with the recorder 78, it will be appreciated that the indicators 77 and 91 provide the operator of the apparatus with a complete visual representation which is diagnostic of the proper functioning of the earth formation fluid sampler. Thus in accordance with the present invention an accurate record is provided in situ of the hydrostatic pressure of the drilling liquid and of the shut-in pressure of the formations, information which is valuable to drilling operators. In addition, there is provided a record of changes in hydraulic pressure as the tool descends and indications of the actuation of the various valves with attendant pressure changes in hydraulic pressure, which shows immediately whether or not the tool is operating properly. It is thus apparent that the apparatus may be operated more reliably and efficiently than heretofore possible.

Furthermore, by employing the regulator 65, the pressure in the hydraulic system is maintained within safe limits. This feature materially adds to the reliability of operation.

Moreover, the other features of the hydraulic system materially increase the reliability of the apparatus embodying the present invention. In particular, since the valve element 114 in valve 105 is releasably locked in its open position, the valve may not be inadvertently closed. Also, since a locked, closed position is afforded, after a sample is obtained it may not be inadvertently lost. The provision of a by-pass between hydraulic line 43 and low pressure chamber 123 via line 43a and valve 125 is an obviously advantageous additional safety feature.

In the following detailed descriptions of various elements illustrated in FIG. 2, similar components are identified by the same reference numerals.

Figure 4:
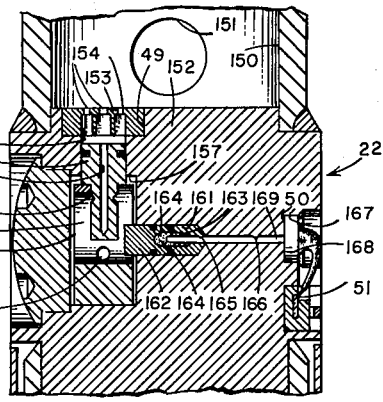
FIG. 4 is a view in longitudinal cross-section of a portion of the apparatus in FIG. 1 designated by the numeral 4, drawn to an enlarged scale.

As shown in FIG. 4, valve 48 (FIGS. 4 and 2) may be disposed near the upper end of housing section 22 where a hollow cylindrical portion 150 is provided with one or more openings 151 through which drilling liquid 19 may enter. Conduit 49 (FIGS. 4 and 2) is defined by a cylindrical recess in a solid body portion 152 of housing section 22 which receives a disk-shaped member 153 having a plurality of openings 154. The openings 154 extend through the disk 153 and their upper ends are of reduced size so that member 153 acts as a fluid filter. Extending downwardly from recess 49 is a longitudinal bore 155 in which a plug 156 is appropriately sealed. The free end of plug 156 projects into a chamber 157 containing a retainer 158 arranged to hold plug 156 in place. A central bore 159 extends downwardly from the end of plug 156 and terminates just short of the lower end. Plug 156 has an annular recess 160 cut into its cylindrical outer surface at a level above the lower extremity of bore 159 so that the plug may be easily broken to provide a fluid communication path from opening 49 via openings 154, the bore 159 and chamber 157 to chamber 46 (FIGS. 2 and 12) by a conduit 160′ (FIGS. 2, 4 and 12).

A lateral opening 161 extends from chamber 157 into the body 152 of housing section 22 along an axis intersecting the lower extremity of plug 156. Disposed in opening 161 is a plug 162 having a central chamber 163 for receiving an explosive material 164. Plug 162 is sealed to opening 161 and it has an axial opening 165 extending from chamber 163 in alignment with the bore 166 that extends laterally through body 152 and terminating at an enlarged opening 167. A conventional electrical igniter has a head portion 168 received by opening 167 and a body portion 169 extending through bore 166, opening 165 and into chamber 163. Housing section 22 is constructed of a metal and an electrical connection is made between terminal 50 and the housing. The remaining portion of the electrical circuit to the igniter is completed by a connection to conductor 51.

In the condition illustrated in FIG. 4, valve 48 is normally closed to fluid flow. However, when a source of electrical energy is connected between terminals 50 and 51 and adjusted so that an appropriate amount of current flows through the igniter 168, 169, explosive 164 is detonated and the hind portion of plug 162 is impelled out of bore 161. A portion of the plug 162 thus strikes the lower end of plug 156 sharply, and the latter is broken along a plane defined by recess 160. Accordingly, valve 48 is opened to fluid flow.

Turning now to the portion of the apparatus including shear pin 62 and stop, 63, 64, the construction and operation may best be appreciated by referring first to FIG. 5a. As shown there, cylinder 57 is disposed in a lower part of housing section 22. As illustrated in FIG. 12, cylinder 57 extends upwardly through housing section 22 and from the upper end of this cylinder, cylinder 46 extends longitudinally and upwardly through housing section 22 to a level just below the portion represented in FIG. 4.

The lower portion of the wall of compartment 57 is received by cylinder 61 and another cylinder 60 of reduced diameter providing a seat which conforms to the configuration of the wall of the cylinder and its tubular extension 59. Extension 59 is fluidly sealed to the wall of cylinder 60 in an appropriate manner. A conduit 170 extends axially from the lower end of cylinder 57 and is in fluid communication with a transverse conduit 171 that is aligned with an opening 172 that extends laterally through the wall of cylinder 60. Opening 172 has an enlarged portion which receives a fluid conducting connector 173 that is attached to the upper end of tube 66 and the connector 173 is appropriately sealed in opening 172. The lower end of tube 66 (FIGS. 2, 5a, 5c and 8a) is fluidly connected to valve 65 which will be described in detail hereinafter.

As seen in the upper section of FIG. 5a, shear pin 62 is received by aligned openings 174 and 175 that extend laterally through the walls of cylinders 61 and 57, respectively. The head of the shear pin is threaded into opening 174 and it is provided with a section 176 of reduced cross-sectional area in the vicinity of the abutting surface members 59 and 61. The material of the shear pin and the size of reduced section 176 are designed to provide a preselected breaking strength. For example, in a practical embodiment of the invention, a shear pin having a breaking strength of 2,500 pounds has been successfully employed.

In order to limit relative longitudinal movement between members 22 and 61, there are provided a plurality of projections 63 which are threaded into lateral openings 177 in the wall of cylinder 57. The head of each projection 63 is arranged to engage the periphery of an oval-shaped opening in the wall of cylinder 61 which defines stop 64. As shown in FIG. 6, the projections 63 extend radially from the axis of housing 22 along lines of essentially equal angular spacing from one another.

It will be observed that normally a fluid connection exists between compartment 57 and tube 66 and that there is no communication with the fluid in the borehole. However, under the circumstances described hereinbefore, it may be desirable to draw upwardly on the supporting cable while the shoes 20 and 21 are in engagement with the sidewall of the borehole with a force sufficient to break shear pin 62. Of course, this permits longitudinal displacement between members 59 and 61; however, pins 63 engage the stops 64 to limit movement. At the limit, the lower end 178 of member 59 is above the level of opening 172 so that tube 66 is placed in fluid communication with a fluid conduit 179 that extends laterally through the wall of cylinder 61. Accordingly, the pressure in the hydraulic system is equalized to the pressure of the liquid in the borehole. Moreover, conduit 171 is at the level of a port 180 that extends through the wall of cylinder 61 so hydraulic pressure in cylinder 57 is released into the borehole.

Preferably, the members 22, 59, 60 and 61 are arranged to effect confronting surfaces that are vertically spaced from one another to provide openings 181, 182 and 183. These openings are filled with an appropriate material, such as a heavy grease, for inhibiting the sealing action of the drilling mud. Thus, despite high hydrostatic mud pressures that might be encountered, the member 22, 59 can be displaced relative to member 60, 61.

The organization of elements including the regulating valve 65 and the valves 119 and 125 will now be described. As seen in FIGS. 5a and 5c, tube 66 (FIG. 2) extends downwardly from the lower end of cylinder 57 and is fluidly connected by means (not shown) at its lower end to a compartment 185 illustrated in FIGS. 5b, 5c, 8 and 8a in the vicinity of the lower extremity of housing section 22. As seen in the cross-sectional representation of FIG. 8, compartment 185 is provided with a threaded insert 186 having a bore 67 extending radially relative to the longitudinal axis of housing section 22. Bore 67 is open to the drilling liquid of the borehole and is in the nature of a cylinder in which a piston 188 is slidably movable. Piston 188 is fluidly-sealed in bore 67 and has its free end 189 exposed to the drilling liquid which tends to urge the piston in the direction of arrow 190. A compression spring 191 extending between a flange 192 of the piston and the free end of insert 186 provides an additional force tending to urge piston 188 in the direction of arrow 190. Although any conventional form of compression spring may be employed for this purpose, the spring 191 may be of the type commonly referred as a Belleville spring and one or more washers 193 disposed between adjacent ends of the spring and insert 186 may be provided in order to adjust the amount of force produced by the spring on piston 188. Movement of piston 188 in the direction of arrow 190 is limited by means of a shoulder defined by a reduced section 194 of bore 185 that is engaged by flange 192.

Fluidly sealed within bore section 194 is an insert 195 having a section of reduced diameter 196 best seen in FIG. 8a received by a smaller bore section 197. Insert 195, 196 has an opening 198 oriented coaxially relative to the axis of bore 185 and having a plurality of sections of increasing diameter in the direction opposite to arrow 190. At its other end opening 198 is provided with an outwardly-flared section 199 providing a seat for a ball-type valve element 200. The termination of bore section 197 provides a seat for a compression spring 201 which engages a disk-shaped member 202 having a plurality of openings 203. The disk 202 is urged by spring 201 against ball 200 which, in turn, is urged toward seat 199. Ball 200, however, may be prevented from engaging the seat by reason of its engagement with the tip of an extension 204 of piston 188 having a stepped configuration conforming essentially to the configuration of opening 198 through which it extends. A fluid connection between compartment 185 and tube 66 is completed by extending line 66 transversely to bore section 197 as shown and parallel to the longitudinal axis of housing section 22 for a short distance. Regulated hydraulic pressure is supplied via a conduit 206 (FIG. 8) that extends transversely to bore section 194 and is connected to conduit 43 (FIGS. 8 and 2), connected in a manner to be described hereinafter.

In operation, hydraulic pressure from hydraulic cylinder 57 is applied via conduit 66 to one side of the piston 188 which has an effective area defined by bore 194 equal to that of bore 187. Accordingly, the applied hydraulic pressure tends to force the piston 188 in a direction opposite to arrow 190 and spring 201 forces ball 200 against seat 199 thereby closing communication between conduits 66 and 206. As pointed out earlier, the pressure of the drilling mud acting on end 189 of piston 188 and the force of spring 191 tend to urge piston 188 in the direction of arrow 190. It is apparent that whenever the applied hydraulic pressure produces a force on piston 188 that is greater than the force resulting from the pressure of the drilling fluid plus the force of spring 191, valve 65 closes. The valve opens, however, whenever the applied hydraulic pressure produces a force that is smaller. Thus, valve 65 provides a continuous regulating action so that after a depth in the borehole is attained providing a given hydrostatic pressure the pressure of the liquid in conduit 206 is always equal to the pressure of the drilling liquid plus a preselected and substantially fixed pressure. Regulated hydraulic pressure, of course, is supplied via conduit 43 to the hydraulic actuator for the shoes 20 and 21.

Conduit 43b extends to valve 119 which, as shown in FIG. 7, may be of the same type illustrated in FIG. 4. It thus comprises a plug 208 extending into a compartment 209 and having a bore 210 in communication with conduit 207. Another plug 211 contains an explosive 212 which may be detonated by means of an electrical igniter 213.

As seen in FIG. 5b, compartment 209 is fluidly connected by a conduit 214 to another compartment 215 above it in housing section 22. A plug 216 is positioned in conduit 214 and has a head portion 217 extending into compartment 209. A recess 218 in head 217 receives a filter screen 219 which is held in place by a retaining ring 220 and the recess is connected to an opening 221 that extends axially through plug 216 to another axially opening 222. The opening 221 has a section of restricted size defining a fluid-flow controlling orifice 122. A conduit 223 extends between compartment 215 and low pressure chamber 123 as shown in FIG. 5a.

Conduit 43 also extends to valve 125 via conduit 43a which may be identical to the construction of valve 119 illustrated in FIG. 7. Valve 125 is positioned within compartment 215.

In operation, when igniter 213 is energized to drive plug 211 against plug 208 thereby breaking the latter, valve 119 is opened to fluid-flow and a hydraulic connection is completed between conduit 43b and compartment 209. As illustrated in FIG. 5a, a fluid connection exists between compartment 209 and fluid conduit 117 (FIG. 2) so that hydraulic pressure can be applied to valve 105. In addition, hydraulic pressure is bled through screen 219 and orifice 122, opening 221, compartment 215, conduit 223 and into low pressure chamber 123. Accordingly, the pressure in the hydraulic system may be decreased.

In the event the igniter (not shown) for valve 125 is energized, this valve is opened to fluid flow and a fluid connection is established between conduit 43a and conduit 223 via compartment 215. Accordingly, orifice 122 is bypassed by a direct connection between regulating valve 65 and low pressure chamber 123.

Transducer 69—71 may be disposed within a compartment 225 (FIGS. 5b and 5c) which, as shown in FIG. 9, has a section 226 of reduced size fluidly connecting it to conduit 43c. The shoulder defined by the two sections of the compartment provides a seat for an insert 227 having an axial cylinder or bore 68. A plunger or piston 69 is slidably positioned in bore 68 with one end 230 exposed to the hydraulic fluid supplied via conduit 43c. The remaining end 231 is mechanically connected to a head member 232. A hollow extension 233 of insert 227 provides a track or guide 234 in which head 232 is slidably movable and an extension 235 of head 232, of reduced diameter, is received within a compression spring 236 which may conveniently be of the Belleville type. One extremity of spring 236 engages head 232 and the remaining extremity engages a stop 237 so as to bias head 232 and piston 229 in the direction of an arrow 238.

A lateral arm 239 of head 232 is mechanically connected to slider 70 of variable resistor 71. Electrical connections 72 and 73 are completed to the variable resistor in the manner described hereinbefore.

It will be recalled that cylinder 68, constituted by compartment 225 in FIG. 9, is at atmospheric pressure. Hence, when the pressure of the hydraulic system is applied via conduit 43c to the extremity 230 of plunger 69 a force is produced tending to displace piston member 232 in a direction opposite to arrow 238 and in opposition to the bias of spring 236. Accordingly, slider 70 is displaced relative to resistance element 71. It is obvious that the position of slider 70 with respect to resistance element 71 will at all times be indicative of the differential pressure existing between conduit 43 and compartment 225. Since the pressure in compartment 225 is initially established at a given value, the resistance of element 70, 71 will be representative of the hydraulic pressure in conduit 43.

Transducer 80—83 shown in FIG. 2 may be constructed in the same fashion illustrated in FIG. 9.

The borehole tool illustrated in FIG. 1 may be conveniently arranged so that lower housing section 23 has a plug 249 at its upper end arranged to be threaded to a member 250 to which the lower ends of the side rails 24 and 25 are attached. Accordingly, the tool may be separated into two component parts for ease of handling prior to insertion in a well.

As seen in FIG. 10 illustrating in longitudinal cross-section, the details of a junction between housing section 23, plug 249 and member 250, conduit 84 through which a sample of formation may flow extends through member 250 and terminates at an annular opening 251 provided in the vicinity of confronting, horizontal surfaces of members 249 and 250. Another conduit 252 extends longitudinally through plug 249, along a portion thereof containing the components of valve 105 and is connected to a transverse conduit 253 that terminates at valve seat 113. Another conduit 254 extending from the valve seat proides a fluid connection to cylinder 106 in which piston 109 is slidably disposed.

Referring now to the details of valve 105, it will be observed that the body of valve element 114 has a pair of annular recesses 253', 254' receiving O type sealing rings 255 and 256. Of course, any other type of sealing member may be employed, such as a cylindrical body of resilient material seated in a recess having an axial length approximately equal to the spacing between the upper surface of recess 253' and the lower surface of recess 254'. With this arrangement, a fluid seal in valve seat 113 may be provided even though the valve element 114 is not driven to the end of travel within valve seat 113. Thus, the valve may be closed despite the presence of obstructions or extraneous materials such as sand particles.

A rod 257 extends upwardly from the lower end of the valve element and is received by a central bore 258 in a generally cylindrical member 259 in which it is slidably movable. A helical-type compression spring 260 extending between a flange 261 of the valve element and an opposite surface of the member 259 biases these members away from one another and relative movement is limited by means of a C ring 262 seated in an annular groove in rod 257 and engaging the upper surface of member 259.

Valve element 114 is releasably locked in the open position shown by means of a plurality or stack of C rings 263 seated in an annular groove 264 in member 259. These rings are constructed of a resilient material and tend to expand into engagement with an inner surface 265 of a tubular member 266 seated in a bore 267 that extends longitudinally through the upper end of member 249. Opening 265 has a section 269 of gradually decreasing diameter connected to another section 270 having a somewhat smaller diameter. Although the wall of opening 269 inhibits downward movement of C rings 263, a sufficient downward force on member 259 causes the C rings to compress and conform to the diameter change of section 269. They are thus conformed to the diameter of section 270 through which they may pass. Section 270 abruptly increases in diameter at a lower section 271 so that after the C rings 263 engage the wall of section 271, upward movement of the C rings is prevented. Consequently, the valve is positively locked in its closed position. By "positively locked," it is meant that the valve is locked in a nonreleasable manner, the C rings 263 butting against an upper inwardly directed flange of wall 271, or comparable structure, securing the valve from inadvertent upward movement thereof.

Movement of the valve element is effected by means of a piston 115 which is slidable in its cylindrical compartment 116 that extends upwardly through a member 273 that is connected to the upper end of member 266. The piston has a central bore 272 receiving the free end of rod 257, and an extension 274 of member 273 of considerably reduced diameter is fluidly sealed in an opening 275 extending axially through member 250. Conduit 117 extends to the upper termination of opening 275 and an axial bore 276 in extension 274 provides a fluid communication path with the upper end of piston 115.

When hydraulic pressure is applied via conduit 117, opening 275 and bore 276, to cylinder 116, piston 115 is displaced in a downward direction, and as pointed out earlier, C rings 263 compress to permit movement to the section 270 of opening 265 of reduced diameter. Thus, the valve element 115 is displaced from its releasably locked, first position. The hydraulic pressure causes continued displacement of the piston 115 and the lower end of valve element 114 is driven into seat 113 where at least one of the C rings 255 and 256 effects a fluid seal. Spring 260 permits member 259 to be displaced downwardly relative to valve element 114 so that member 259 may be displaced to a position in which C rings 263 can engage section 271 of opening 265. Thereafter, the C rings prevent upward displacement of member 259 and spring 260 maintains valve element 114 within valve seat 113 even though hydraulic pressure is released. Thus, the valve element 114 is in a locked, second condition of operation closing the fluid communication path between conduits 253 and 254.

It is therefore evident that in accordance with this aspect of the present invention, inadvertent action of the valve element 114 from its first position is inhibited and, more important, once a sample is obtained, the valve is locked in its closed position so that the sample may not be lost.

In FIG. 11 the details of insert 27 are shown, illustrating other features of the present invention. As seen there, sample-admitting aperture 86 terminates at the base of a cylindrical recess 92 in the front face of the insert. An annular groove 280 in the cylindrical wall of recess 92 is arranged to cooperate with an O type sealing ring 281 carried by a plug 93 which may be of dished configuration conforming to the general shape of recess 92. Thus, aperture 86 is effectively sealed and the drilling fluid in the borehole may not enter as the apparatus is lowered in the borehole to the position of the formation of interest.

A forward part of insert 27 is provided with a peripheral rim 282 that is imbedded in the material of sealing face 28 which preferably is constructed of a resilient material such as rubber. Extending rearwardly from the section including ridge 282 is a body portion 283 of insert 27 which may be termed a gun-block since gun bore 94 extends through it from the base of recess 92, terminating short of the rear end of portion 283. Gun bore 94 is inclined upwardly at an angle relative to a horizontal plane and a narrow bore 284 extends from the front face of insert 27, terminating at the wall of the rear end of gun bore 94. A conventional projectile may be disposed in the gun bore as generally illustrated by the projectile 95 in FIG. 2 and at an appropriate propellant is positioned behind it for engagement by an igniter such as an igniter 97 of FIG. 2 which is disposed in bore 284. Another bore 285 extending from the face of insert 27 to the rear of a gun block 283 is provided to receive an electrical lead from the igniter disposed in bore 284. Appropriate means may be provided to seal the lead in the bore 285 against fluid intrusion and appropriate electrical connections may be made to the igniter via this lead.

Another gun bore 286 extending from the base of recess 92 is inclined downwardly relative to a horizontal plane. Its rear end terminates short of the rear surface of insert portion 283 and is fluidly connected by a conduit with gun bore 94. Although it is not shown fully in the cut-away representation of FIG. 11, conduit 287 extends from the rear end of gun bore 94 and is arranged to provide a fluid connection with the rear end of gun bore 286. A projectile and an appropriate propellant may be positioned at the rear end of gun bore 286 and by virtue of the presence of conduit 287 when the igniter 284 is energized, the propellants of both gun bores are detonated. Of course, if desired, only a single bullet may be employed for perforating purposes merely by avoiding the use of a propellant behind the projectile in gun bore 286.

In order to minimize the possibility of destroying the fluid seal between sealing face 28 and the sidewall of the borehole at the time the propellants for the perforating bullets are detonated, according to the present invention, the front face of insert 27 is provided with a recess 288 having an oval configuration conforming generally to the shape of the front face and occupying a major portion of surface area. The depth of recess 288 is chosen so that the gases resulting from the detonation of the propellants for the projectiles may have a place to expand.

For example, in a practical embodiment of the invention recess 288 has a longitudinal dimension on the order of four and one-eighth inches, a lateral dimension on the order of one inch and a depth of approximately one-eighth of an inch.

The release mechanism for braking the fluid seal of the sidewall of the borehole may conveniently include a bore 128 extending from the front face of insert 27 to the rear surface of gun block 283. Bore 128 is adapted to receive an explosive material. Its forward end is closed by a sealed cap 128' and a conventional electrical igniter is positioned at its rear end. Another, similar bore 289 may be provided and likewise is adapted to contain an explosive material and an electrical igniter and is closed by a cap 290.

In operation, as pointed out hereinbefore, closure 93 is seated in recess 92 thereby to block sample-admitting opening 86. Moreover, caps 128' and 290 close bores 128 and 289, respectively. After the shoe 20 is driven into engagement with a sidewall of a borehole, the igniter in bore 284 is energized to detonate the propellants for the perforating bullets. These bullets are impelled out of their respective bores thereby fracturing closure 93 and penetrating the formation under investigation. Thus, a path for formation fluid is provided in the formations and at the same time aperture 86 is unblocked so that a sample may flow into the aperture and to the sample-receiving chamber as described hereinbefore. Subsequently the release mechanism may be operated in a manner described earlier whereby cap 128' is driven out to open bore 128 at the same time an explosive force tends to displace the shoe 20 away from the sidewall of the borehole.

Although a specific electrical system has been described in connection with the illustrative embodiments of the invention, obviously other types may be employed. For example, the circuit disclosed in the copending application Serial No. 560,707, filed by Clifford O. Schafer and Dennis R. Tanguy for "Electrical Systems," now Patent No. 2,802,200, may be utilized so that each of two electrical igniters can be selectively energized via a common electrical path.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

We claim:

1. Fluid sampling apparatus comprising: a support member adapted to be passed through a well bore to a given depth below the surface of the earth; a wall-engaging member mounted on said support member for movement between a retracted position and an extended position in engagement with the wall of the well bore; said support member having a sample-receiving chamber; a sample-admitting portion on one of said members movable into sealing engagement with a portion of the wall of said well bore; a sample-receiving opening in said sample-admitting portion; a fluid receiving conduit coupled between said opening and said sample-receiving chamber; a hydraulic system including a hydraulic pressure-responsive actuator mechanically coupled between said members and a hydraulic driver fluidly coupled to said actuator for operating said actuator to move said wall-engaging member into its extended position; a first pressure transducer coupled to said fluid receiving conduit arranged to derive first electrical voltages representative of the pressures in said fluid receiving conduit; a second pressure transducer coupled to said hydraulic conduit arranged to derive second electrical voltages representative of pressures in said hydraulic conduit; and means at the surface of the earth coupled to said transducers and responsive to said voltages for indicating the pressures in said conduits.

2. Fluid sampling apparatus comprising: a support adapted to be passed through a bore hole to the level of a selected earth formation; a wall-engaging device mounted on said support for movement between a retracted position and an extended position in engagement with the sidewall of the borehole and having a sample-admitting portion; a hydraulic system including a pressure-responsive actuator mechanically coupled to said support and to said wall-engaging device and a hydraulic driver fluidly coupled to said pressure-responsive actuator for selectively increasing fluid pressure thereto; means defining a sample-receiving conduit adapted to be fluidly coupled to said sample-admitting portion of said wall-engaging device; a pair of pressure transducers respectively exposed to the hydraulic pressures in said hydraulic system and in said sample-receiving conduit, for deriving electrical voltages representing each of the aforesaid hydraulic pressure; and means at the surface of the earth coupled to said transducers and responsive to said voltages for indicating the pressures in said system and said conduit.

3. Borehole apparatus comprising: a support adapted to be passed through a borehole containing a fluid; a wall engaging device movably mounted on said support; a hydraulic actuator mechanically coupled to said support and to said wall-engaging device for effecting relative movement therebetween; means exposed to the fluid in the borehole for deriving a pressure equal to a predetermined multiple of the pressure of the fluid therein; and means fluidly coupling said last-mentioned means to said hydraulic actuator and including a fluid pressure regulating means for providing a pressure to said hydraulic actuator greater than the pressure of the borehole fluid by a selected, fixed amount over a range of borehole fluid pressures.

4. Borehole apparatus comprising: a support adapted to be passed through a borehole containing a fluid; a wall-engaging device movably mounted on said support; a hydraulic actuator mechanically coupled to said support and to said wall-engaging device for effecting relative movement therebetween; means for deriving a hydraulic pressure equal to a predetermined multiple of the pressure of the borehole fluid; means fluidly coupling said last-mentioned means to said hydraulic actuator; and fluid pressure regulating means interposed in said fluidly coupling means for providing a pressure to said hydraulic actuator greater than the pressure of the borehole fluid by a selected, fixed amount over a range of borehole fluid pressures.

5. Borehole apparatus comprising: a support adapted to be passed through a borehole containing a fluid; a wall-engaging device movably mounted on said support; a hydraulic actuator mechanically coupled to said support and to said wall-engaging device for effecting relative movement therebetween; a pressure multiplier exposed to the fluid in the borehole for deriving a pressure equal to a predetermined multiple of the pressure of the fluid therein; and a fluid communication path extending between said pressure multiplier and said hydraulic actuator and including a fluid pressure controller having a valve adapted to close a portion of said path extending to said hydraulic actuator, having a differential-pressure-responsive device mechanically coupled to said valve and exposed to the fluid in the borehole and to any fluid in a portion of said path extending between said controller and said pressure multiplier, and having means for developing a selected force acting on said differential-pressure-responsive device in aiding relation with the force developed by the pressure of the borehole fluid.

6. Borehole apparatus comprising: a support adapted to be passed through a borehole containing a fluid; a wall-engaging device movably mounted on said support; a hydraulic actuator mechanically coupled to said support and to said wall-engaging device for effecting relative movement therebetween; a pressure multiplier exposed to the fluid in the borehole for deriving a pressure equal to a predetermined multiple of the pressure of the fluid therein; a fluid communication path extending between said pressure multiplier and said hydraulic actuator; a valve included in said path and having a movable control member for selectively closing said path; and a pressure-responsive device including means defining a cylinder, a piston movably supported within said cylinder and mechanically coupled to said movable control member of said valve, means for introducing the pressure of the borehole fluid to one end portion of said cylinder providing movement of said portion in a direction tending to open said valve, means for introducing the pressure developed by said pressure multiplier to the remaining end portion of said cylinder, and spring means biasing said piston in said direction.

7. Fluid-sampling apparatus comprising: a support adapted to be passed through a borehole to the level of a selected earth formation and having a sample-receiving chamber; means carried by said support for establishing a fluid communication path between the selected formation and said sample-receiving chamber; valve means in said fluid communication path to said sample-receiving chamber and including a valve element movable from a first position in which said path is open to fluid flow to a second position interrupting said path; means for inhibiting movement of said valve element from said first to said second position in response to forces smaller than a given value; a hydraulic motor including means defining a cylinder and a piston movably disposed in said cylinder and mechanically coupled to said valve element; and selectively actuated means independent of said fluid communication path establishing means for applying hydraulic pressure to said hydraulic motor to develop a driving force on said piston at least equal to said given force thereby to displace said valve element from said first position to said second position; and means to maintain said valve element in said second position after release of said hydraulic pressure.

8. Fluid-sampling apparatus comprising: a support adapted to be passed through a borehole containing a fluid to the level of a selected earth formation and having a sample-receiving chamber; means carried by said support for establishing fluid communication between the selected formation and said sample-receiving chamber; valve means in the fluid communication path to said sample-receiving chamber and including a hydraulically-operated valve element movable from a releasably locked first position to a positively locked second position interrupting said fluid communication path; and means responsive to the pressure of the fluid in the borehole for deriving hydraulic pressure to displace said valve element between the aforesaid first and second positions.

9. Fluid-sampling apparatus comprising: a support adapted to be passed through a borehole to the level of a selected earth formation and having a sample-receiving chamber; means including a wall-engaging device carried by said support for establishing fluid communication between the selected formation and said sample-receiving chamber said wall-engaging device being movable between a retracted position and an extended position in engagement with the sidewall of the borehole; a hydraulic system including a pressure responsive actuator mechanically coupled to said support and to said wall-engaging device and a hydraulic driver fluidly coupled to said pressure-responsive actuator for selectively increasing the fluid pressure thereto; first valve means in the fluid communication path to said sample-receiving chamber and including a valve element movable from a releasably locked first position to a locked second position interrupting said fluid communication path and a hydraulic actuator for said valve element; means defining a low pressure chamber; means defining a fluid communication path extending from said hydraulic driver and having a first portion terminating at said low pressure chamber and a second portion terminating at said hydraulic actuator for said valve element, said first portion of said path having at least one restriction providing a rate of fluid flow slower than in said second portion of said path; second valve means normally closing said path to fluid flow; and means for selectively opening said second valve means to apply hydraulic pressure to said hydraulic actuator for said valve element thereby to displace said valve element between the aforesaid first and second positions and simultaneous to initiate bleeding of hydraulic pressure into said low pressure chamber.

10. Fluid-sampling apparatus comprising: a support adapted to be passed through a borehole to the level of a selected earth formation and having a sample-receiving chamber; means carried by said support for establishing fluid communication between the selected formation and said sample-receiving chamber including a wall-engaging member having a sample-admitting aperture and a hydraulic actuator for said member; valve means in the fluid communication path to said sample-receiving chamber and including a hydraulically-operated valve element movable from a first, inactive position to a second position interrupting said fluid communication path; a source of hydraulic pressure; means including a fluid conduit for selectively applying hydraulic pressure from said source to said hydraulic actuator; means defining a low pressure chamber; means defining another fluid conduit hydraulically connected to a point in the fluid path including said source, said first-mentioned conduit and said hydraulic actuator and having one branch extending to said hydraulically-operated valve and another branch including a fluid-flow-controlling orifice and extending to said low pressure chamber; and valve means normally closing said other fluid conduit, but selectively operable to open said other fluid conduit to fluid flow.

11. Fluid-sampling apparatus comprising: a support adapted to be passed through a borehole containing a fluid to the level of a selected earth formation and having a sample-receiving chamber; means carried by said support for establishing fluid communication between the selected formation and said sample-receiving chamber including a wall-engaging member having a sample-admitting aperture and a hydraulic actuator for said member; valve means in the fluid communication path to said sample-receiving chamber and including a hydraulically-operated valve element movable from a first, inactive position to a second position interrupting said fluid communication path; a generator for utilizing the hydraulic pressure of the fluid in the borehole to develop a greater hydraulic pressure; means including a fluid conduit for selectively applying hydraulic pressure from said generator to said hydraulic actuator; means defining a low pressure chamber; means defining another fluid conduit hydraulically connected to a point in the fluid path including said generator, said first-mentioned conduit and said hydraulic actuator and having a first branch extending to said hydraulically-operated valve and second branch extending to said low pressure chamber, said second branch having at least one restriction to provide a rate of fluid flow therein slower than in said first branch; and valve means normally closing said other fluid conduit, but selectively operable to open said other fluid conduit to fluid flow.

12. A pack-off shoe for an earth formation fluid sampler adapted to be passed through a borehole to the level of a selected formation comprising: a sealing member of flexible material having a wall-engaging surface and an essentially central opening; a body received by and sealed to the periphery of said opening, having a wall-engaging surface effectively forming a continuation of said wall-engaging surface of said sealing member and a bore extending transversely relative to said surface, and said body additionally having a recess extending into said wall-engaging surface thereof and fluidly coupled to one extremity of said bore; closing means for blocking said bore to fluid flow; and explosive means for operating on said closing means selectively to open said bore to fluid flow while said wall-engaging surface is disposed in fluid sealed engagement with the bore hole wall, said recess affording sufficient volume to accommodate the gases resulting from the detonation of said explosive means.

13. Fluid sampling apparatus comprising: a support adapted to be passed through a borehole to the level of a selected earth formation; a wall-engaging device having a wall-engaging surface and mounted on said support for movement between a retracted position and an extended position in engagement with the sidewall of the borehole and having a sample-admitting portion, said wall-engaging device having a bore extending transversely relative to said wall-engaging surface and a recess in said surface in the vicinity of one extremity of said bore; closing means for blocking said bore to fluid flow; explosive means for operating on said closing means selectively while said wall-engaging surface is disposed in fluid sealed engagement with the borehole wall to open said bore to fluid flow, said recess affording sufficient volume to accommodate the gases resulting from the detonation of said explosive means without causing disengagement of said wall-engaging surface with the borehole wall; a hydraulic system including a pressure-responsive actuator mechanically coupled to said support and to said wall-engaging device to displace said wall-engaging device relative to said support, a hydraulic driver fluidly coupled to said pressure-responsive actuator for selectively increasing fluid pressure thereto including means for deriving a hydraulic pressure equal to a predetermined multiple of the pressure of the borehole fluid, and a fluid pressure regulator between said actuator and said driver to regulate the pressure to said hydraulic actuator; said support having a fluid sample chamber and a sample-receiving conduit fluidly coupling said sample-admitting portion of said wall-engaging device with said fluid sample chamber; a valve means in said sample-receiving conduit including a hydraulically operated valve element movable from a releasably locked first position to a locked second position interrupting said sample-receiving conduit; means for deriving hydraulic pressure to displace said valve element between the aforesaid first and second positions; a pair of pressure transducers mounted on said support, means fluidly coupling said pressure transducers to said hydraulic system and said sample-receiving conduit, respectively, to expose said transducers to the hydraulic pressures therein for deriving electrical voltages representing each of the aforesaid hydraulic pressures; and means at the surface of the earth coupled to said transducers and responsive to said voltages for indicating the pressures in said system and said conduit.

14. Fluid sampling apparatus comprising: a support adapted to be passed through a borehole to the level of a selected earth formation; a wall-engaging device having a wall-engaging surface and mounted on said support for movement between a retracted position and an extended position in engagement with the sidewall of the borehole and having a sample-admitting portion; a hydraulic system including a pressure-responsive actuator mechanically coupled to said support and to said wall-engaging device to displace said wall engaging device relative to said support, a hydraulic driver fluidly coupled to said pressure-responsive actuator for selectively increasing fluid pressure thereto including means for deriving a hydraulic pressure equal to a predetermined multiple of the pressure of the borehole fluid, and a fluid pressure regulator between said actuator and said driver to regulate the pressure to said hydraulic actuator; said support having a fluid sample chamber; means defining a sample-receiving conduit fluidly coupling said sample-admitting portion of said wall-engaging device with said fluid sample chamber; a pair of pressure transducers mounted on said support, means fluidly coupling said pressure transducers to said hydraulic system and said sample-receiving conduit, respectively, to expose said transducers to the hydraulic pressures therein for deriving electrical voltages representing each of the aforesaid hydraulic pressures; and means at the surface of the earth coupled to said transducers and responsive to said voltages for indicating the pressures in said system and said conduit.

15. Fluid sampling apparatus comprising: a support adapted to be passed through a borehole to the level of a selected earth formation; a wall-engaging device having a wall-engaging surface and mounted on said support for movement between a retracted position and an extended position in engagement with the sidewall of the borehole and having a sample-admitting portion; a hydraulic system including a pressure-responsive actuator mechanically coupled to said support and to said wall-engaging device to displace said wall-engaging device relative to said support and a hydraulic driver fluidly coupled to said pressure-responsive actuator for selectively increasing fluid pressure thereto; said support having a fluid sample chamber and a sample-receiving conduit fluidly coupling said sample-admitting portion of said wall-engaging device with said fluid sample chamber; valve means in said sample-receiving conduit including a hydraulically operated valve element movable from a releasably locked first position to a locked second position interrupting said sample-receiving conduit; means for deriving hydraulic pressure to displace said valve element between the aforesaid first and second positions; a pair of pressure transducers mounted on said support, means fluidly coupling said pressure transducers to said hydraulic system and said sample-receiving conduit, respectively, to expose said transducers to the hydraulic pressures therein, for deriving electrical voltages representing each of the aforesaid hydraulic pressures; and means at the surface of the earth coupled to said transducers and responsive to said voltages for indicating the pressures in said system and said conduit.

16. Fluid sampling apparatus comprising: a support adapted to be passed through a borehole to the level of a selected earth formation; a wall-engaging device having a wall-engaging surface and mounted on said support for movement between a retracted position and an extended position in engagement with the sidewall of the borehole and having a sample-admitting portion, said wall-engaging device having a bore extending transversely relative to said wall-engaging surface and a recess in said surface in the vicinity of one extremity of said bore; closing means for blocking said bore to fluid flow; and explosive means for operating on said closing means selectively while said wall-engagnig surface is disposed in fluid sealed engagement with the borehole wall to open said bore to fluid flow, said recess affording sufficient volume to accommodate the gases resulting from the detonation of said explosive means without causing disengagement of said wall-engaging surface with the borehole wall; a hydraulic system including a pressure-responsive actuator mechanically coupled to said support and to said wall-engaging device to displace said wall-engaging device relative to said support and a hydraulic driver fluidly coupled to said pressure responsive actuator for selectively increasing fluid pressure thereto; said support having a fluid sample chamber and means defining a sample-receiving conduit fluidly coupling said sample-admitting portion of said wall-engaging device with said fluid sample chamber; a pair of pressure transducers mounted on said support, means fluidly coupling said pressure transducers to said hydraulic systems and said sample-receiving conduit, respectively, to expose said transducers to the hydraulic pressures therein for deriving electrical voltages representing each of the aforesaid hydraulic pressures; and means at the surface of the earth coupled to said transducers and responsive to said voltages for indicating the pressures in said system and said conduit.

17. Fluid sampling apparatus comprising: a support adapted to be passed through a borehole to the level of a selected earth formation; a wall-engaging device having a wall-engaging surface and mounted on said support for movement between a retracted position and an extended position in engagement with the sidewall of the borehole and having a sample-admitting portion, said wall-engaging device having a bore extending transversely relative to said wall-engaging surface and a recess in said surface in the vicinity of one extremity of said bore; closing means for blocking said bore to fluid flow; explosive means for operating on said closing means selectively while said wall-engaging surface is disposed in fluid-sealed engagement with the borehole wall to open said bore to fluid flow, said recess affording sufficient volume to accommodate the gases resulting from the detonation of said explosive means without causing disengagement of said wall-engaging surface with the borehole wall; a hydraulic system including a pressure-responsive actuator mechanically coupled to said support and to said wall-engaging device to displace said wall-engaging device relative to said support, a hydraulic driver fluidly coupled to said pressure-responsive actuator for selectively increasing fluid pressure thereto including means for deriving a hydraulic pressure equal to a predetermined multiple of the pressure of the borehole fluid, and a fluid pressure regulator between said actuator and said driver to regulate the pressure to said hydraulic actuator; said support having a fluid sample chamber and a sample-receiving conduit fluidly coupling said sample-admitting portion of said wall-engaging device with said fluid sample chamber; and a valve means in said sample-receiving conduit including a hydraulically operated valve element movable from a releasably locked first position to a locked second position interrupting said sample-receiving conduit.

18. Fluid sampling apparatus comprising: a support adapted to be passed through a borehole to the level of a selected earth formation; a wall-engaging device having a wall-engaging surface and mounted on said support for movement between a retracted position and an extended position in engagement with the sidewall of the borehole and having a sample-admitting portion, said wall-engaging device having a bore extending transversely relative to said wall-engaging surface and a recess in said surface in the vicinity of one extremity of said bore; closing means for blocking said bore to fluid flow; explosive means for operating on said closing means selectively while said wall-engaging surface is disposed in fluid-sealed engagement with the borehole wall to open said bore to fluid flow, said recess affording sufficient volume to accommodate the gases resulting from the detonation of said explosive means without causing disengagement of said wall-engaging surface with the borehole wall; and a hydraulic system including a pressure-responsive actuator mechanically coupled to said support and to said wall-engaging device to displace said wall-engaging device relative to said support, a hydraulic driver fluidly coupled to said pressure-responsive actuator for selectively increasing fluid pressure thereto including means for deriving a hydraulic pressure equal to a predetermined multiple of the pressure of the borehole fluid, and a fluid pressure regulator between said actuator and said driver to regulate the pressure to said hydraulic actuator; said support having a fluid sample chamber and a sample-receiving conduit fluidly coupling said sample-admitting portion of said wall-engaging device with said sample-receiving chamber.

19. Fluid sampling apparatus comprising: a support adapted to be passed through a borehole to the level of a selected earth formation; a wall-engaging device having a wall-engaging surface and mounted on said support for movement between a retracted position and an extended position in engagement with the sidewall of the borehole and having a sample-admitting portion; a hydraulic system including a pressure-responsive actuator mechanically coupled to said support and to said wall-engaging device to displace said wall-engaging device relative to said support, a hydraulic driver fluidly coupled to said pressure-responsive actuator for selectively increasing fluid pressure thereto including means for deriving a hydraulic pressure equal to a predetermined multiple of the pressure of the borehole fluid, and a fluid pressure regulator between said actuator and said driver to regulate the pressure to said hydraulic actuator; said support having a fluid sample chamber and a sample-receiving conduit fluidly coupling said sample-admitting portion of said wall-engaging device with said fluid sample chamber; a valve means in said sample-receiving conduit including a hydraulically operated valve element movable from a releasably locked first position to a locked second position interrupting said sample-receiving conduit; and means for deriving hydraulic pressure to displace said valve element between the aforesaid first and second positions.

20. Fluid sampling apparatus comprising: a support adapted to be passed through a borehole to the level of a selected earth formation, a wall-engaging device having a wall-engaging surface and mounted on said support for movement between a retracted position and an extended position in engagement with the sidewall of the borehole and having a sample-admitting portion, said wall-engaging device having a bore extending transversely relative to said wall-engaging surface and a recess in said surface in the vicinity of one extremity of said bore; closing means for blocking said bore to fluid flow; explosive means for operating on said closing means selectively while said wall-engaging surface is disposed in fluid-sealed engagement with the borehole wall to open said bore to fluid flow, said recess affording sufficient volume to accommodate the gases resulting from the detonation of said explosive means without causing disengagement of said wall-engaging surface with the borehole wall; hydraulically operated means coupled between said wall-engaging device and said support to move said device between its retracted and extended positions; said support having a fluid sample chamber and a sample-receiving conduit fluidly coupling said sample-admitting portion of said wall-engaging device with said fluid sample chamber; a valve means in said sample-receiving conduit including a hydraulically operated valve element movable from a releasably locked first position to a locked second position interrupting said sample-receiving conduit; and means for deriving hydraulic pressure to displace said valve element between the aforesaid first and second positions.

21. Fluid sampling apparatus comprising: a support adapted to be passed through a bore hole to the level of a selected earth formation and having a sample-receiving chamber; means carried by said support for establishing a fluid communication path between the selected formation and said sample-receiving chamber; valve means in said fluid communication path to said sample-receiving chamber; said valve means including a hydraulic pressure-responsive valve element movable from a releasably retained first position in which said path is open to fluid flow to a second position in which said path is interrupted; selectively actuated means independent of said fluid communication path establishing means for deriving hydraulic pressure to displace said valve element between the aforesaid first and second positions; and means to maintain said valve element in said second position after release of said hydraulic pressure.

References Cited in the file of this patent

UNITED STATES PATENTS

| | | |
|---|---|---|
| 2,249,815 | Ennis | July 22, 1941 |
| 2,433,828 | Cassell | Jan. 6, 1948 |
| 2,441,894 | Mennecier | May 18, 1948 |
| 2,491,273 | Lehner | Dec. 13, 1949 |
| 2,582,719 | Ramsey | Jan. 15, 1952 |
| 2,607,222 | Lane | Aug. 19, 1952 |
| 2,612,346 | Nelson | Sept. 30, 1952 |
| 2,629,444 | O'Donnell | Feb. 24, 1953 |
| 2,674,313 | Chambers | Apr. 6, 1954 |
| 2,686,039 | Bender | Aug. 10, 1954 |
| 2,711,186 | Perez | June 21, 1955 |
| 2,725,283 | Mounce | Nov. 29, 1955 |
| 2,745,497 | Dale et al. | May 15, 1956 |
| 2,746,550 | Mitchell | May 22, 1956 |
| 2,780,290 | Natho | Feb. 5, 1957 |
| 2,799,350 | Conrad | July 16, 1957 |
| 2,802,200 | Schafer et al. | Aug. 6, 1957 |
| 2,813,585 | Walstrom | Nov. 19, 1957 |
| 2,821,256 | Boller | Jan. 28, 1958 |
| 2,851,107 | Chivens et al. | Sept. 9, 1958 |